(12) United States Patent
Laun

(10) Patent No.: US 6,911,929 B2
(45) Date of Patent: *Jun. 28, 2005

(54) METHOD AND APPARATUS FOR DIRECTLY DIGITIZING MICROWAVE SIGNALS

(75) Inventor: Robert Laun, Hausach (DE)

(73) Assignee: Vega Grieshaber AG, Wolfach (DE)

( * ) Notice: Subject to any disclaimer, the term of this patent is extended or adjusted under 35 U.S.C. 154(b) by 28 days.

This patent is subject to a terminal disclaimer.

(21) Appl. No.: 10/225,266

(22) Filed: Aug. 20, 2002

(65) Prior Publication Data

US 2003/0052808 A1 Mar. 20, 2003

Related U.S. Application Data

(60) Provisional application No. 60/315,272, filed on Aug. 28, 2001.

(30) Foreign Application Priority Data

Aug. 20, 2001 (DE) .......................................... 101 40 821

(51) Int. Cl.$^7$ ........................... H03M 1/12; G01S 13/08
(52) U.S. Cl. ...................................... 341/155; 342/124
(58) Field of Search .................................. 341/118, 119, 341/120, 144, 155; 342/124, 21, 102, 103, 644, 642, 637, 643, 109, 118, 138, 127, 134, 135, 175, 194, 195; 73/597, 290 V, 861.25, 596, 602, 627, 629, 861.18

(56) References Cited

U.S. PATENT DOCUMENTS

| | | | |
|---|---|---|---|
| 4,521,778 A | | 6/1985 | Knepper |
| 4,972,386 A | * | 11/1990 | Lau ............................. 367/99 |
| 5,144,525 A | | 9/1992 | Saxe et al. |
| 5,200,983 A | | 4/1993 | Kogan |
| 5,614,911 A | * | 3/1997 | Otto et al. .................. 342/124 |
| 5,841,666 A | | 11/1998 | Perdue et al. |
| 5,847,567 A | | 12/1998 | Kielb et al. |
| 6,087,978 A | | 7/2000 | Lalla et al. |
| 6,107,957 A | * | 8/2000 | Cramer et al. .............. 342/124 |
| 6,295,874 B1 | * | 10/2001 | Strutt et al. .................... 73/597 |
| 6,373,261 B1 | * | 4/2002 | Kielb et al. ................. 324/644 |
| 6,480,131 B1 | * | 11/2002 | Roper et al. ................. 341/155 |
| 6,489,923 B1 | * | 12/2002 | Bevan et al. ............... 342/378 |
| 6,531,977 B2 | * | 3/2003 | McEwan ...................... 342/21 |
| 6,581,460 B1 | * | 6/2003 | Laun ........................ 73/290 V |

FOREIGN PATENT DOCUMENTS

| | | |
|---|---|---|
| DE | 30 13 256 | 10/1981 |
| DE | 31 07 444 | 10/1982 |
| DE | 42 40 491 | 6/1994 |
| DE | 44 07 396 | 9/1995 |
| DE | 196 49 838 | 4/1998 |

OTHER PUBLICATIONS

Gage, *Product Advertisement for CompuScope 85G*, Apr. 10, 2001, 1 sheet.

Maxim Integrated Products, +–5V. 1.5Gsps. 8–Bit ADC with On–Chip 2.2 GHz Track/Hold Amplifier, 19–1942: Revision of Sep. 1999, pp. 1–32.

Devine, *Radar Level Measurement: The User's Guide*, 2000, pp. 47–75.

M. Skolnik, "Introduction to Radar Systems", Auflage 1980, Title Page and 22–29(5 sheets).

\* cited by examiner

Primary Examiner—Michael Tokar
Assistant Examiner—Linh V Nguyen
(74) Attorney, Agent, or Firm—Fay Kaplun & Marcin, LLP (57) ABSTRACT

Described is a method and an apparatus of directly digitizing microwave signals reflected at a filling product surface of a filling product present in a receptacle, in which method the microwave signals reflected at the filling product surface are sampled unmodified in their frequency, and the therefrom resulting analog values are converted into digital values, with successive digital values being stored in various intermediate memories, and the intermediately stored digital values are read out from the intermediate memories and are stored in a terminal memory unit, to which accesses an evaluation arrangement which determines the filling level height.

26 Claims, 11 Drawing Sheets

Digital envelope composed from the sampling values of the echo signals of the transmission pulses 1 and 2

Fig. 11

METHOD AND APPARATUS FOR DIRECTLY DIGITIZING MICROWAVE SIGNALS

PRIORITY CLAIM

This application claims the benefit of U.S. Provisional Patent Application Ser. No. 60/315,272 filed on Aug. 28, 2001 and German Patent Application Serial No. 101 40 821.8 filed on Aug. 20, 2001 which are expressly incorporated herein, in their entirety, by reference.

TECHNICAL FIELD

The present invention relates to a method and an apparatus for directly digitizing microwave signals reflected from a filling product surface of a filling product present in a receptacle, as well as to a filling level measuring device working on the transit time principle and emitting microwave signals. Furthermore, the present invention relates to a filling level measurement device working on the transit time principle and emitting microwave signals.

Reduced to the core features and hence expressed in a simplified manner, microwave signals are generated (on a pulse basis or continuously) by a transmitting means in a filling level measuring device of the mentioned kind, and are radiated via an antenna, such as, for example, a horn, rod or microstrip antenna into the direction of the filling product surface, or are guided to the filling product surface by means of a waveguide (rod, cable or also rope). The microwave signals reflected at the filling product surface—in general also designated as echo signals—are fed to a reception circuit via a reception means, which in the most cases is identical to a transmission antenna, or by means of the above-mentioned waveguide, and are sampled. The analog values resulting from the sampling process may be converted into digital values, and then are made available to an evaluation means. In the evaluation means, the filling level height is determined from the digital values.

BACKGROUND INFORMATION

For example, DE 42 40 491 A1 appears to disclose a filling level measuring device of the initially mentioned kind that work on the transit time principle and emit for example microwave signals. For processing the reflected and received microwave signals, various analog circuits or components are nowadays available so as to generate a so-called envelope curve, which may then be digitized for assessing the filling level height here from. The generation of an envelope is sufficiently known, and accordingly, there is no need for further explaining this technology (e.g. cf.: DE 44 07 396 C2; M. Scholnick, "Introduction to Radar Systems", $2^{nd}$ ed. 1980, McGraw-Hill; Peter Devine, "Radar Level Measurement—The User's Guide" VEGA Controlls Ltd., 2000, ISBN 0-9538920-0-X).

In the present technical field, one works with microwave signals having a frequency of for example 1 up to 30 GHz or more. Due to these high frequencies, various analog circuits or components have been necessary to date for determining the exact filling level from the received microwave signals. In particular, so-called "mixers" are inter alia used, by means of which a temporal "lengthening" of the envelope is performed, so that the sampling of the envelope curve with usual A/D converters (pulse frequencies of, for example, about 25 microseconds) with a sufficiently fine sampling lattice (for achieving a sufficient accuracy of the determined filling level height) becomes possible. This means that in particular microwave pulses are transformed by means of a mixer and an associated oscillator into another frequency and time domain. Hereby, pulses are, for example, lengthened in time after the time transformation by about the factor 160,000, whereby a pulse duration of 1–2 nanoseconds prior to the transformation corresponds to a pulse duration of about 160–320 microseconds after the transformation. These time-lengthened pulses are then supplied to the A/D converter, which samples this signal in a sampling lattice of about 25 microseconds. Thus, with a pulse length of 160 microseconds, about six sampling values are available per pulse. With these values, accuracies of about 5 mm may be achieved in the filling level height determination. It has to be pointed out that the accuracy of the filling level height determination depends also on the magnitude of the sampling values per echo pulse, on the steepness of the pulse slope and on the accuracy of the A/D converter.

In summary, it has to be noted that devices for determining the filling level height on the basis of reflected microwaves, in particular microwave pulses, perform an analog processing of the received signals so as to be able to achieve the desired accuracy in the determination of the filling level height. The use of analog components or analog circuit technology, however, can be subject to disadvantages. Thus, in the dimensional configuration of the circuit, component tolerances and manufacturing divergences of the components have to be taken into account, and also have to be monitored during the production. Analog components moreover exhibit temperature dependencies, which have to be considered and cause a rather significant test effort. Temperature dependencies and component tolerances, in addition, can result in a decrease of the reproducibility and accuracy of the output signals, and have to be minimized or compensated by an additional effort. An disadvantage may also to be seen in that modifications in the functional mode of such analog circuits can only be performed at an important effort. Finally, analog circuits may be also sensitive for interfering influences.

SUMMARY OF THE INVENTION

An object of the present invention consists in providing an apparatus, by means of which the number of analog circuit components in devices of the mentioned kind may be reduced, and the aforementioned disadvantages thus are at least reduced.

This object may be solved according to a first aspect of the present invention by means of a method of directly digitizing microwave signals reflected at a filling product surface of a filling product present in a receptacle, wherein the method comprises the following method steps: sampling the microwave signals reflected at the filling product surface unmodified in their frequency, converting the analog values resulting from the sampling step into digital values, storing successive digital values of the converting step in various intermediate memories, reading out the intermediately stored digital values from said intermediate memories and storing the read out digital values in a terminal memory unit, to which accesses an evaluation means for determining the filling level height.

An corresponding inventive apparatus comprises, according to the first aspect of the invention, a reception circuit into which the reflected microwave signal is to be fed, and which is configured for the amplification of same, but leaves the frequency thereof unmodified, an A/D converter connected with said reception circuit, which is configured for sampling the amplified microwave signal and converts the therefrom resulting analog values into digital values, several intermediate memory means in each case connected with the A/D converter, a terminal memory means connected with the intermediate memory means, and a control means providing for intermediately storing successive digital values in various intermediate memory means, and the intermediately stored digital values are restored in the terminal memory unit, which are then available to the evaluation means for determining the filling level height.

Furthermore, the above-mentioned object may be solved according to a second aspect of the present invention by means of a method of directly digitizing microwave signals reflected at a filling product surface of a filling product present in a receptacle, wherein the method comprises the following method steps: sampling the microwave signals reflected at the filling product surface unmodified in their frequency, converting the therefrom resulting analog values into digital values by means of a plurality of A/D converters, with in each case successive analog values being converted into digital values from various A/D converters, and storing the digital values in a terminal memory unit, to which accesses an evaluation means for determining the filling level height.

A corresponding the inventive apparatus for directly digitizing microwave signals reflected from a filling product surface of a filling product present in a receptacle, comprises a reception circuit into which the reflected microwave signal is to be fed, and which is configured for the amplification of same, but leaves the frequency thereof unmodified. Moreover, several A/D converters each connected with the reception circuit are provided, which are each configured for sampling the amplified microwave signals and convert the therefrom resulting analog values into digital values. Furthermore, a terminal memory unit is provided connected with the A/D converters for storing the individual digital values. Finally, a control means is present providing for the fact that the individual A/D converters sample alternatingly (with more than two A/D converters in turns or one after the other) the amplified microwave signal and convert in each case an analog value into a digital value, and providing for the fact that the individual digital values are stored in the terminal memory unit, which are then available to an evaluation means for determining the filling level height.

According to a third aspect of the present invention, the above-mentioned object may be solved by means of a method of directly digitizing microwave signals reflected at a filling product surface of a filling product present in a receptacle, wherein the method comprises the following method steps: a first sampling step for sampling microwave signals reflected at the filling product surface unmodified in their frequency, a first converting step for converting the analog values resulting from the first sampling step into digital values by means of an A/D converter, a first storing step for storing the digital values resulting from the first converting step in a terminal memory unit, a second sampling step for sampling at least one further microwave signal reflected later in time at the filling product surface unmodified in its frequency but offset from the first sampling, and a second converting step for converting analog values resulting from the second sampling step into digital values by means of an A/D converter, a second storing step for storing the digital values of the second converting step in the terminal memory means, wherein the entirety of the stored digital values of the first and second converting steps represent an envelope and are available to an evaluation means for determining the filling level height.

An exemplary embodiment of the present invention according to the third aspect provides that for an envelope, sampling values from temporally successively received echo signals are used. Since for determining a filling level, the time between the emission of the microwave pulse and the reception of the echo signal reflected at the filling product surface is measured, a maximum value is predetermined for this time defining the maximum measurement range of the device. During this time, the echo signal is normally sampled by the A/D converter in equal intervals of time. When the filling level has been determined from this envelope, the next pulse is emitted, the echo signals are sampled, and the filling level is again determined here from. If the sampling values are now so generated that the moments of the samplings are at the same place in the echo signal from cycle to cycle, than a doubling of the sampling rate may be achieved in that the sampling of the second envelope is offset by half a sampling time. So as to obtain an envelope having a doubled sampling rate, two envelopes having the lower sampling rate hence have to be generated. For a determination of the filling level, two cycles are therewith necessary. This method may be applied when the echo signals scarcely change from cycle to cycle; each modification tampers the composed envelope and hence result in measurement errors. With this method, a triplication or quadruplication, etc., may also be achieved. By means of the mentioned variant, a direct digitization of the envelope without the interconnection of intermediate memories or the use of several A/D converters would likewise be possible. In other words: only by means of one A/D converter, a high sampling rate may be achieved in toto by sampling several envelopes with in each case a low sampling rate, and at the same time, without the interconnection of intermediate memories, a storage of the digital values originating from the A/D converter in an available terminal memory unit may ensue. The envelope serving the purpose of evaluation, which in the end is available in the form of digital values in the terminal memory unit, hence is composed here of several envelopes, which are generated temporally successively, and which have been sampled by the A/D converter with a "low" frequency.

According to a forth aspect of the present invention, a method of directly digitizing microwave signals reflected at a filling product surface of a filling product present in a receptacle comprises the following method steps: sampling microwave signals reflected at a filling product surface unmodified in their frequency with a first rate, storing analog values resulting from the sampling step in an analog memory unit, reading out the stored analog values with a second rate less than the first rate, converting the read out analog values into digital values by means of an A/D converter, storing the digital values in a terminal memory unit, and providing the entirety of the stored digital values representing an envelope curve for an evaluation means for determining the filling level height.

An exemplary embodiment of an apparatus for directly digitizing microwave signals reflected at a filling product surface of a filling product present in a receptacle according to the forth aspect comprises a reception circuit, into which the reflected microwave signal has to be fed, and which is configured for amplifying same, but which leaves the frequency thereof unmodified, an analog memory unit connected with the reception circuit for storing the amplified analog values of the reception circuit, an A/D converter connected with the analog memory unit, which is configured for reading out the analog values stored in the analog memory unit, and wherein the A/D converter samples the analog values and converts them into digital values, a terminal memory unit connected with the A/D converter for storing the individual digital values, and a control means providing for the fact that the amplified reflected signal is stored into the analog memory unit with a first rate, and providing for the fact that the amplified reflected signal stored in the analog memory unit is read out with a second rate less than the first rate and converted into digital values by means of the A/D converter, and providing for the fact that the digital values are stored in the terminal memory unit, which are then available to an evaluation means for determining the filling level height.

In general, the invention is, for the first time, based on the idea of no longer temporally "lengthening" the received microwave signals by means of a mixer, but to directly digitize the received, temporally "unlengthened" microwave signal by means of one or several A/D converters. So as to be able to achieve the sampling rates required for a sufficient measurement accuracy in spite of the non-performed temporal lengthening and to be nevertheless able to use memory components having commercial access times, said intermediate memories are present and/or several A/D converters are used. By interconnecting intermediate memories or by using several A/D converters, despite the very high frequencies of the "unlengthened" microwave signals, sampling rates may be achieved as in the prior art with temporal lengthening (by means of analog components). As soon as the respective digital values are stored in the terminal memory unit, the processing of the digital values, and hence the evaluation ensues in the usual manner. This means that now, due to the mixer no longer present, very high frequencies of the signals to be digitized and therewith the required, very high sampling rates are compensated for by the use of intermediate memories and/or several A/D converters or combination of these two alternatives.

If only one A/D converter is used for digitizing the microwave signals and/or the therefrom determined envelope, then it may be better to provide at least two intermediate memories between the A/D converter and the terminal memory unit, into which intermediate memories digital values are alternatingly written. Thus, the high frequency of the A/D converter may also be used with usual memory chips such as SRAM or DDR-SRAM that have cycle times of, for example, 2.5–5 ns. The more intermediate memories are provided, the slower the used memory chips are able to work.

In that several A/D converters are provided, an A/D converter may work alternatingly for each pulse, and the corresponding value may be stored in the terminal memory unit, so that the sampling rate of the individual A/D converter may be reduced.

Thus, it may be possible according to an exemplary embodiment of the present invention to perform digitizing with usual components in spite of the immensely high frequencies, a fact which eliminates the disadvantages of analog components and in particular the disadvantages of the previous mixer.

According to a further exemplary embodiment of the present invention each A/D converter is assigned one or several intermediate memories, so that a converter cycle and a storage cycle of one A/D converter may ensue independent of those of the other A/D converter.

In that several intermediate memories connected in series are provided, it is possible to use slower-working memory chips, which hence are more cost-efficient.

The A/D converters and/or individual intermediate memory means may also be connected with a single terminal memory unit, it is of course also possible to provide single terminal memory chips which in turn are all connected with the evaluation unit, hence are available for an access by the evaluation means.

In principle, it is the question of maintaining the required high sampling rate of the A/D converter with the high frequencies of the "unlengthened" received microwave signals, and to be nevertheless able to use commercial components. By means of the alternating storage and various intermediate memory means, this may be performed for the first time, alternatively hereto, the use of several A/D converters is just possible.

A/D converters able to perform the high pulse time requested for sampling the microwave signals having a very high frequency, it is true, require in part a power of up to five watt; however, by the operation of the A/D converter for a space of time of 1 ns up to 0.5 microseconds, and in particular 10 ns up to 0.3 microseconds, an operation may also be carried out on a 4–20 mA two-wire loop. The mentioned spaces of time suffice for performing the required sampling of a microwave signal. An inventive apparatus for directly digitizing according to the aforementioned explanations may be arranged as a single constructional unit spaced apart from the remaining components of a filling level measurement device. In particular, it is, however, purposeful to provide such apparatuses or such a circuit directly inside of the filling level measurement device. Same is then preferably accommodated in the housing of the filling level measurement device.

In conclusion, it has to be stated that for directly digitizing, preferably one or several A/D converters are used in combination with intermediate memories. The use of intermediate memories may also be omitted in certain circumstances. In this case, the digital output values of the at least one A/D converter would be directly written into the terminal memory unit, to which an evaluation means accesses. The possible sampling frequency with which the envelope is digitized, essentially depends on the speed of the terminal memory unit. The speed of the available A/D converters suffices for achieving the requested sampling frequency, but the corresponding number of digital values must also be allowed to be written into the memory unit with the corresponding speed. The faster the terminal memory unit is able to store, the higher may then be the sampling frequency or sampling rate without any intermediate memories being necessary.

As already mentioned above, according to a forth aspect of the invention, an analog memory unit is connected between a reception circuit and an A/D converter. In this case the design is based on the principle of FISO (Fast In Slow Out). The analog memory unit may be designed as, for example, shown in DE 30 13 256 A1, U.S. Pat. No. 5,200,981, or U.S. Pat. No. 5,144,525. The analog memory unit may alternatively be designed basically like a circuit sold under the name "CompuScope 85G" of the company Tectronix. The analog memory unit makes it possible to store the received microwave signal (analog signal) without modifying its frequency. Furthermore, an A/D converter can be used which samples the read out analog values with a rate less than the rate with which the analog values are stored in the analog memory unit. By means of such an design, it is possible to use an A/D converter less fast than an A/D converter used in the other exemplary embodiments of the invention.

Finally, one skilled in the art may derive from the description of the various exemplary embodiments of the invention that the terms "unmodified frequency", "leaves the frequency unmodified", and similar terms include methods wherein a frequency is slightly modified but not as modified as it is done in combination with "mixers" mentioned before by means of which a temporal "lengthening" of the envelope is performed. With other words, the terms mentioned above mean that in particular according to the present invention microwave pulses are not transformed by means of a mixer and an associated oscillator into another frequency and time domain.

BRIEF DESCRIPTION OF THE DRAWINGS

For further explanation and better understanding, several embodiments of the invention will be described in detail in the following.

DETAILED DESCRIPTION

With reference to FIG. 1 and FIGS. 6–9, the principle working method and the principle structure of a filling level measurement device will initially be explained. As can be seen from FIG. 1, in the cover zone of a receptacle 1, a filling level measurement device 2 is mounted, that is composed of an electronic unit 3 and a horn antenna 4. The filling level measurement device 2 is connected with a remote control panel or such like via a two-wire loop 9. Via said two-wire loop 9, which is in particular configured as a 4–20 mA two-wire loop, ensues the communication, as well as the energy supply of the filling level measurement device 2. In the electronic unit 3, microwave pulses are generated and radiated via the horn antenna 4 in the direction of the bulk product 7 present in the receptacle 1. The microwave pulses 5 are reflected at the bulk product surface 8, and are again received by the horn antenna 4 as an echo signal 6.

The generation of microwave pulses 5 or pulse packets, and the processing of reflected pulses 6 will be described in more detail by means of the FIGS. 6–9. The microwave pulse is generated in a pulse generator 10 and is transmitted via a circulator 11 or a directional coupler to the horn antenna 4, and is radiated from there. The received echo signal in turn, is again further transmitted via the circulator 11 or directional coupler to a pre-amplifier 12, serving the purpose of amplifying the received microwave signal. Downstream of the pre-amplifier 12, a mixer 19 is connected, which in turn is in connection with a local oscillator 20. In the mixer 19, the received echo signal is mixed with the fixed-frequency signal of the local oscillator 20 for transforming the echo signal into a lower frequency range (in particular kHz range). During this transformation, by an appropriate tuning of the oscillators 10 and 20, a temporal lengthening of the echo signal is achieved; for more details hereto, reference is, for example, made to DE 31 07 444 C2.

Figure 7:
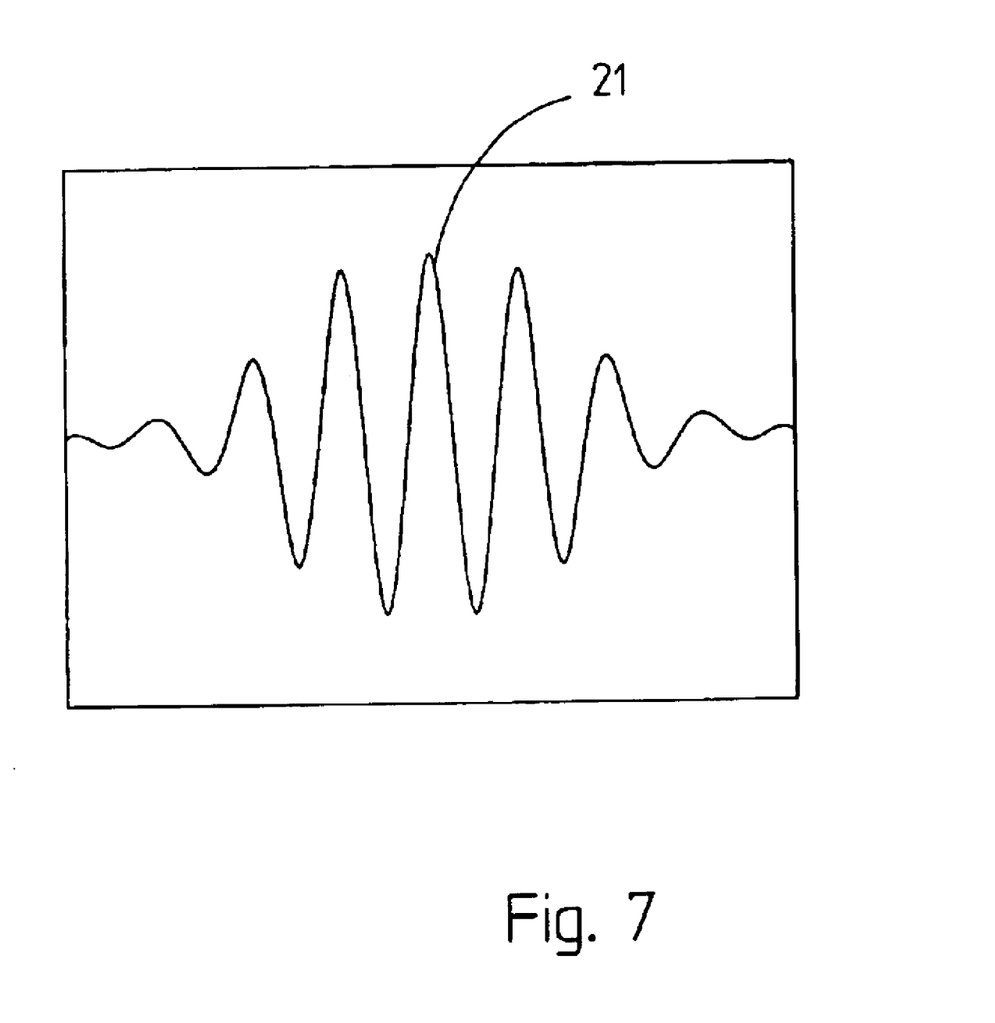
FIG. 7 shows a representation of a microwave pulse.
Figure 8:
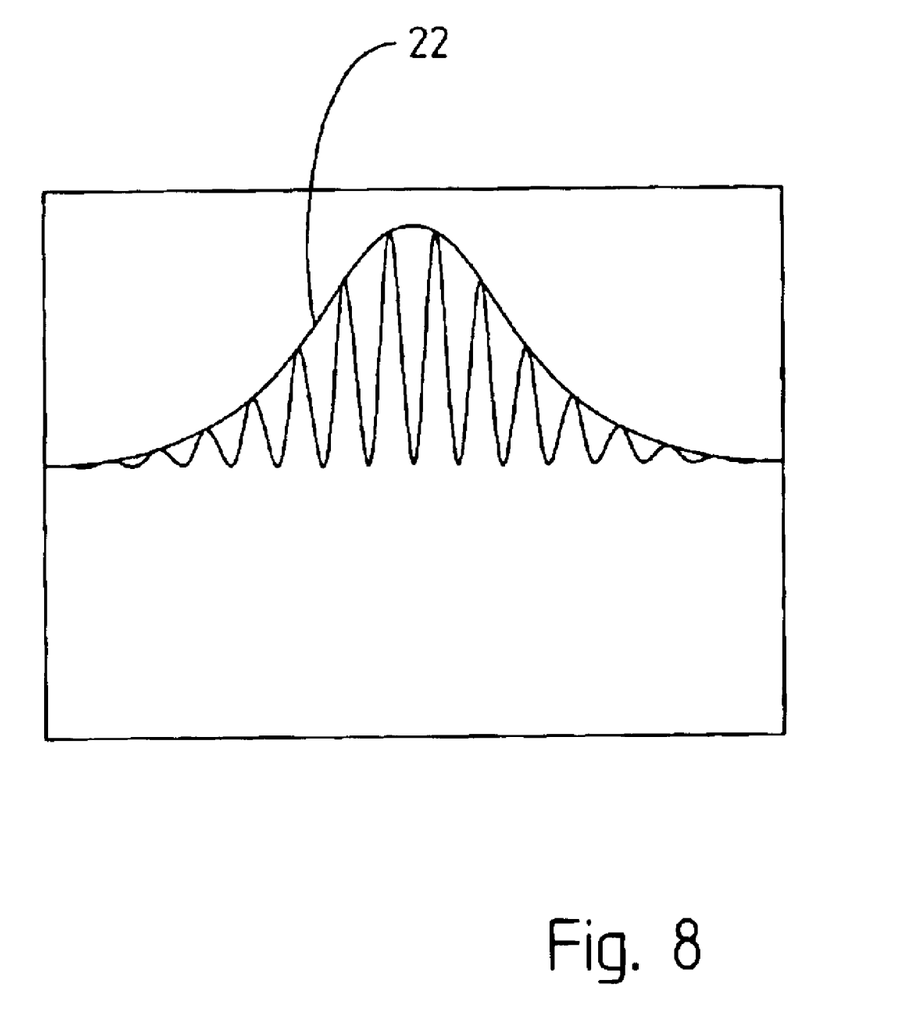
FIG. 8 shows a representation of an envelope.
Figure 9:
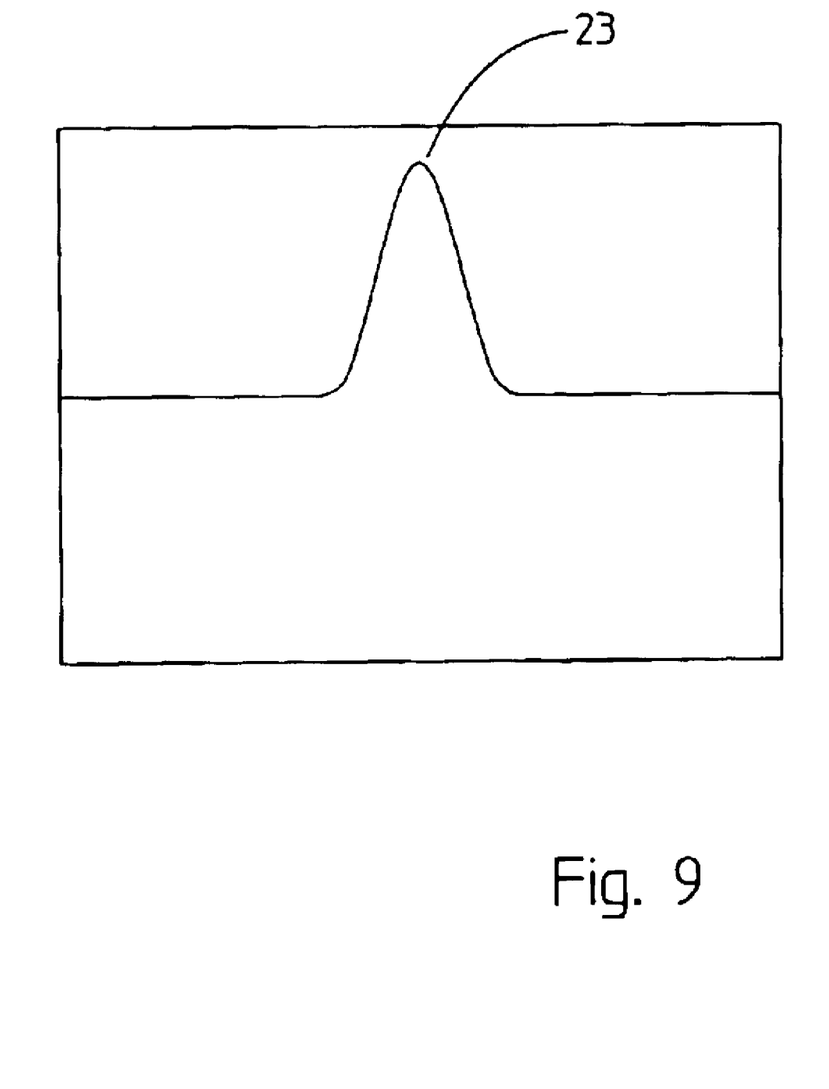
FIG. 9 shows a representation of a monopulse.

The output signal of the mixer 19 that corresponds to the microwave pulse packet 21 as per FIG. 7 corresponding to the monopulse 23 as per FIG. 9, is then filtered by a low pass filter 13, and is then digitized by an A/D converter 14. By the low pass filter 13, an envelope 22 as per FIG. 8 is formed. So as to make a larger dynamic range available to the A/D converter, a logarithmic or controllable amplifier may be provided upstream of the A/D converter 14.

Figure 6:
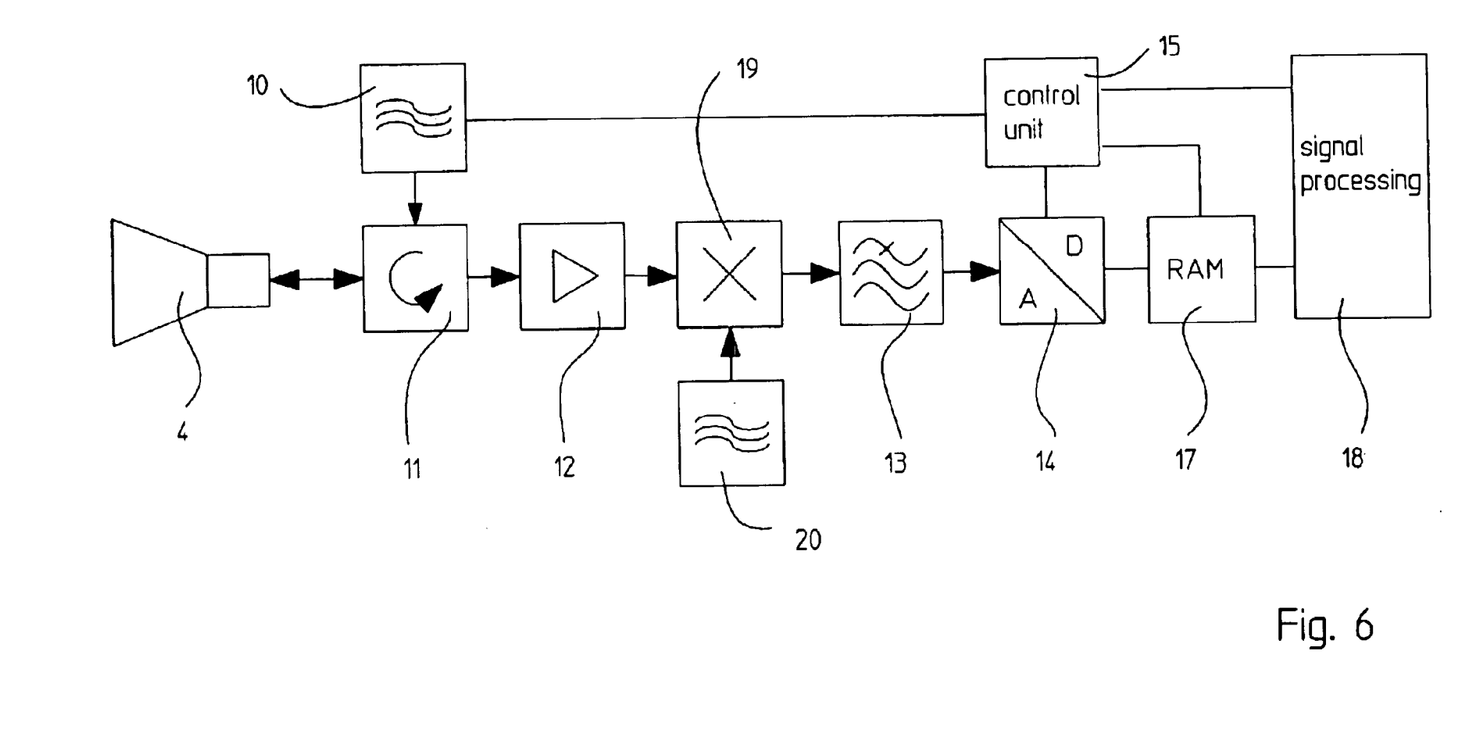
FIG. 6 shows electronic components of an apparatus comprising a mixer and an oscillator according to the present invention.

The digitized values from the A/D converter 14 are stored in a memory 17 for further processing. A signal processing or evaluation means 18, which is not explained in more detail here, since it corresponds to the prior art, accesses said memory. A control unit 15 performs the start of the A/D converter and the transfer of the converted values into the memory 16. Alternatively hereto, the control unit 15 or the pulse generator 10 may predefine the start moment of the pulse generation, and hence the start of the measurement process.

It has still to be noted here that with current realizations, the components 14, 15, 17 and 18 are in the most cases parts of a microprocessor or are realized by same. If pulse packets are used as transmission pulses, then a rectifier has to be provided upstream of a possible logarithm processing.

Figure 1:
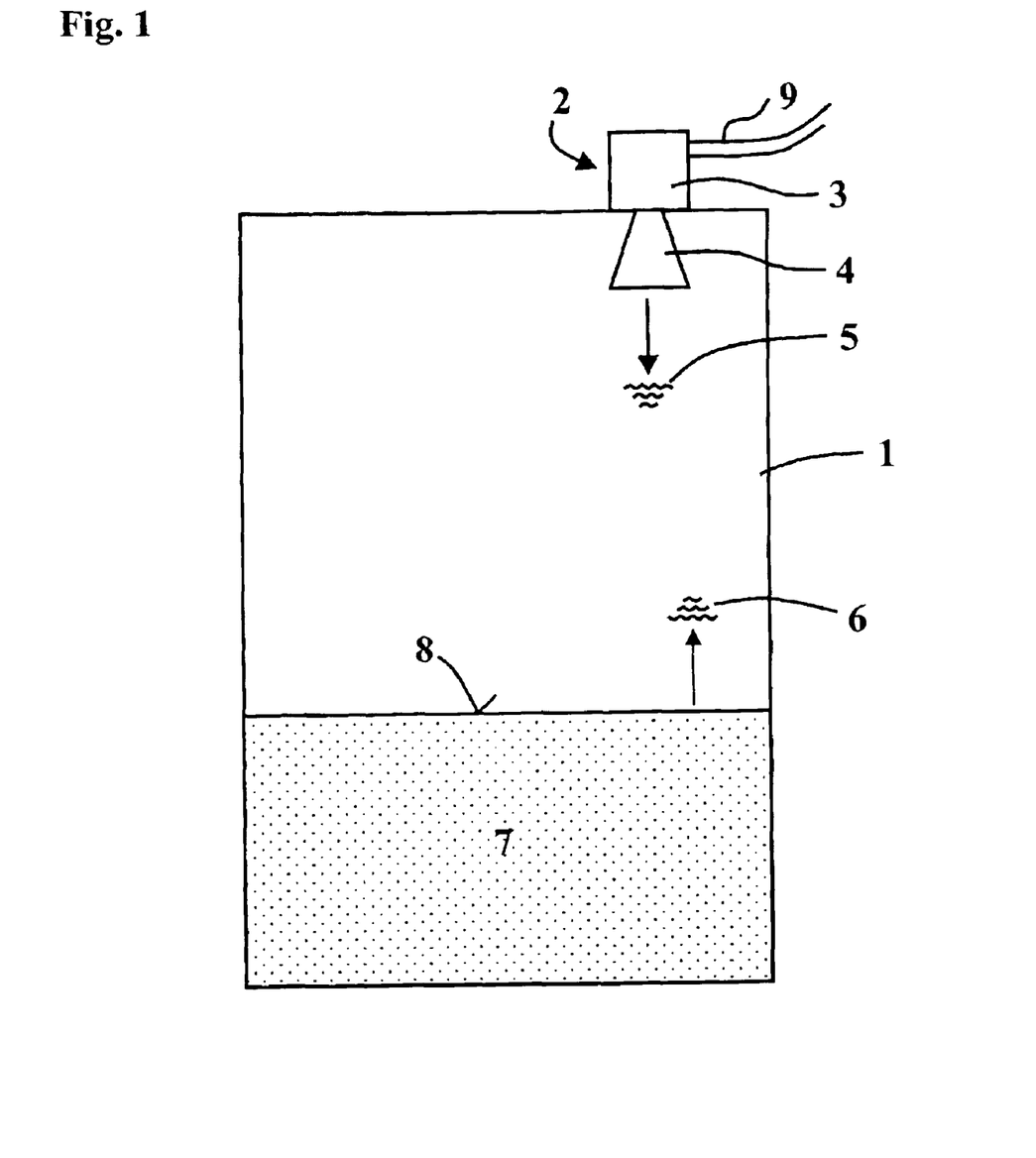
FIG. 1 shows an exemplary embodiment of a receptacle including a filling level measurement device according to the present invention.
Figure 2:
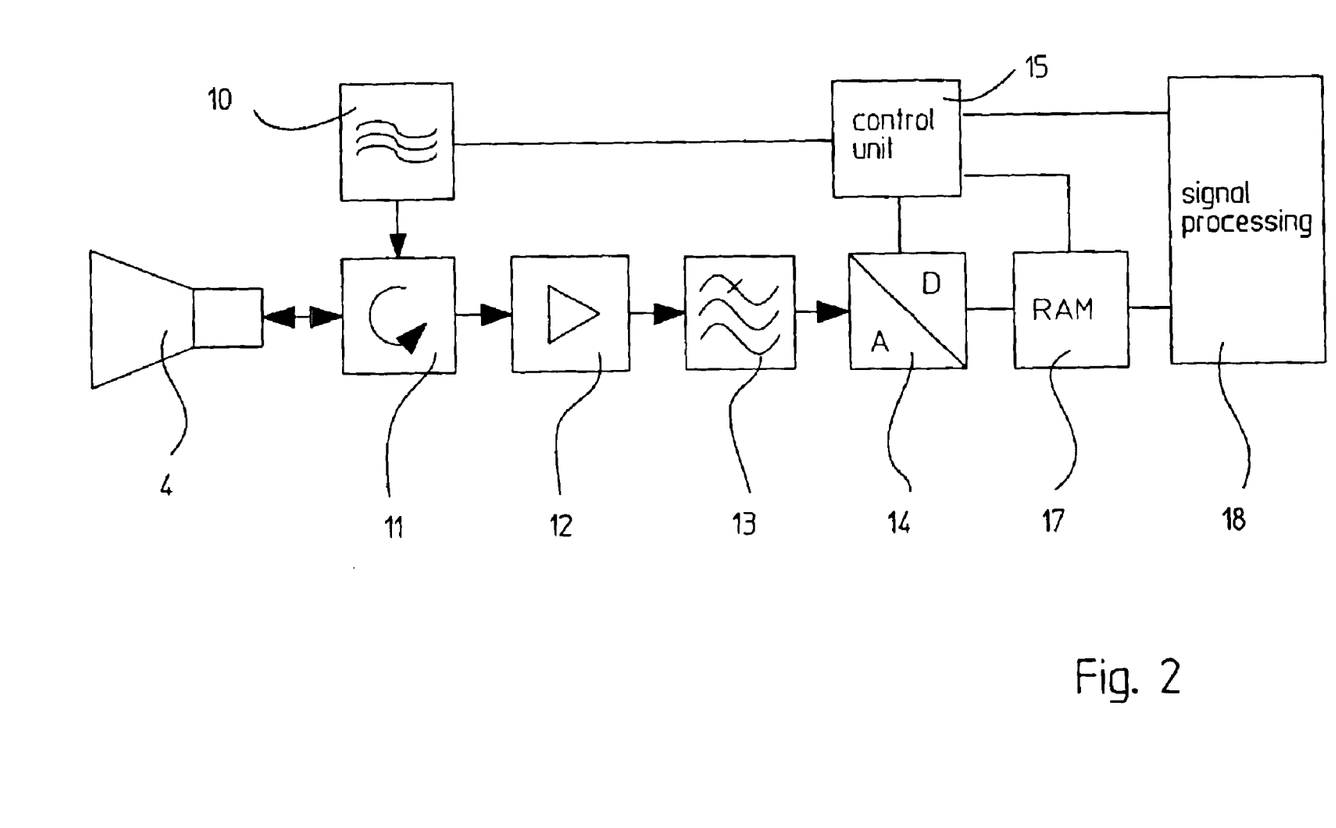
FIG. 2 shows electronic components of a filling level measurement device according to a first exemplary embodiment of the present invention.
Figure 3:
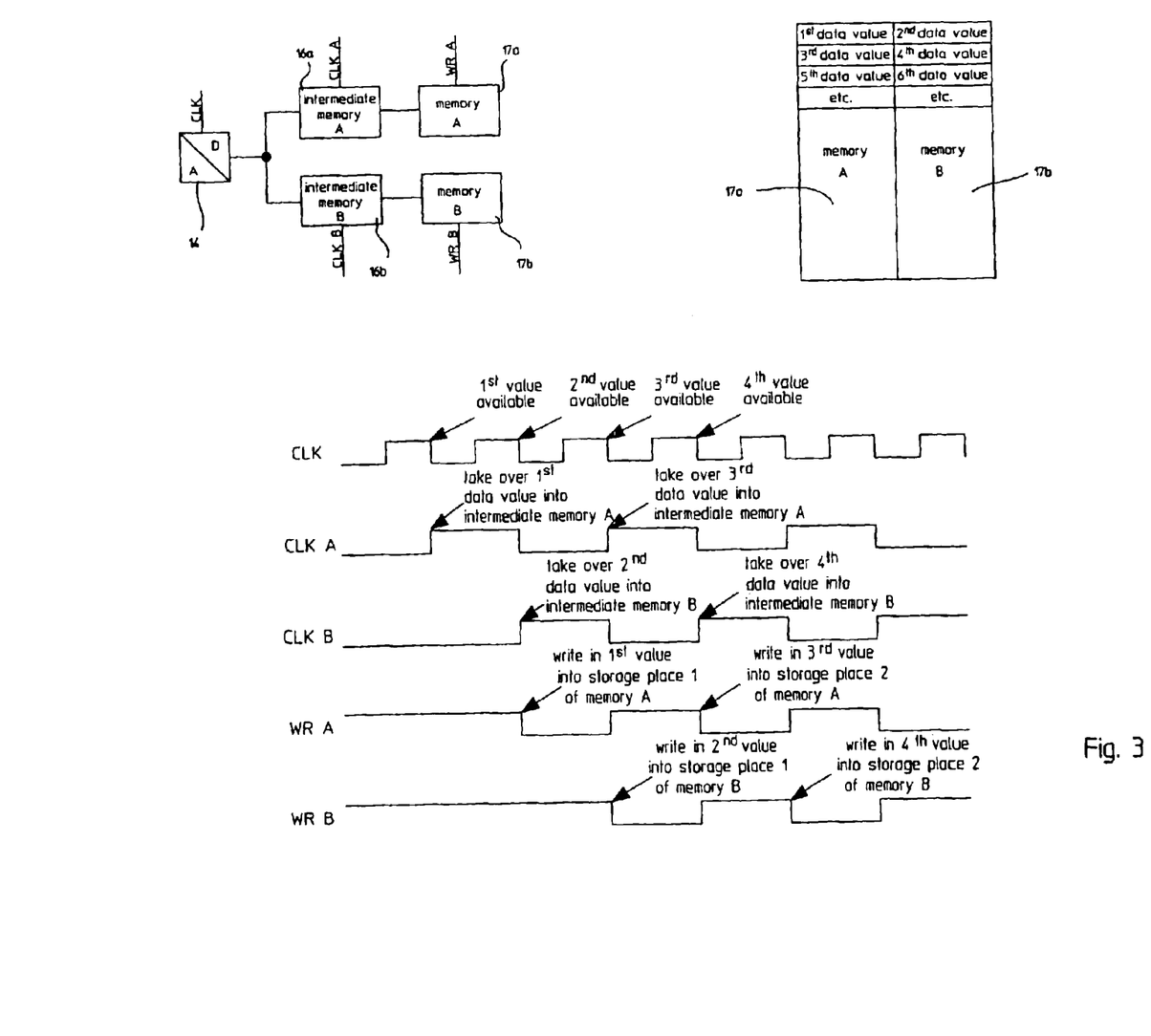
FIG. 3 shows details of the embodiment as per FIG. 2 and the associated sampling and storage scheme.

In contrast to the apparatus mentioned above, it is now inventively provided according to a first exemplary embodiment of the present invention, to omit the mixer 19 and the associated local oscillator 20; cf. FIG. 2. For this purpose, the A/D converter 14 and the associated memory 17 are configured as per FIG. 3, i.e. the A/D converter 14 accesses the "unlengthened" echo signal. So as to achieve the sampling rate necessary for the desired measurement accuracy, and to be able to use usual memory chips, the A/D converter 14, however, is connected with several intermediate memories 16a, 16b, which in turn are connected with the terminal memory unit 17 composed of several memory chips 17a, 17b. Of course, it is also possible to provide the terminal memory unit 17 for each of the single intermediate memories 16a, 16a, as it is illustrated in FIG. 3

When the first data value is now stored in the intermediate memory 16a, then the intermediate memory 16b is available for storing the next data value. At the same time, the stored value has already been written into the terminal memory 17 by the intermediate memory 16a, so that the intermediate memory 16a is now again available for the third data value. Thus, all data values are in the end present in the terminal memory unit 17 or 17a, 17b. When single terminal memory units 17a, 17b are present, then the first, third and fifth data value, etc., is stored in the memory unit 17a, and the second, fourth and sixth is stored in the memory unit 17b. Both terminal memory units 17a, 17b are in turn available to the evaluation means 18.

Figure 4:
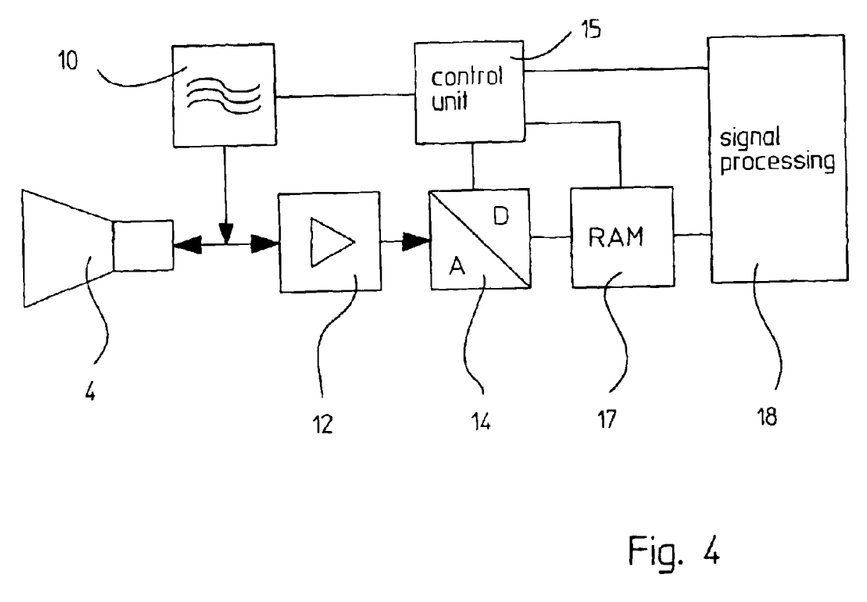
FIG. 4 shows a further exemplary embodiment of an apparatus according to the present invention.

In contrast to the exemplary embodiment of the present invention shown in FIG. 2, the circulator or directional coupler 11 has been renounced of in the alternative as per FIG. 4. By using a monopulse 23 as per FIG. 9, the low pass filter 13 and a possible rectifier in the pre-amplifier 12 may be moreover renounced of. The combination of an A/D converter 14 and a terminal memory unit 17 corresponds to the embodiment as per FIG. 3. As an alternative to the realization as per FIG. 3, an apparatus as per FIG. 5 may also be used in the embodiments of FIGS. 2 and 4, which comprise several A/D converters 14a, 14b. By using two or more A/D converters, the sampling rate may be increased.

Figure 5:
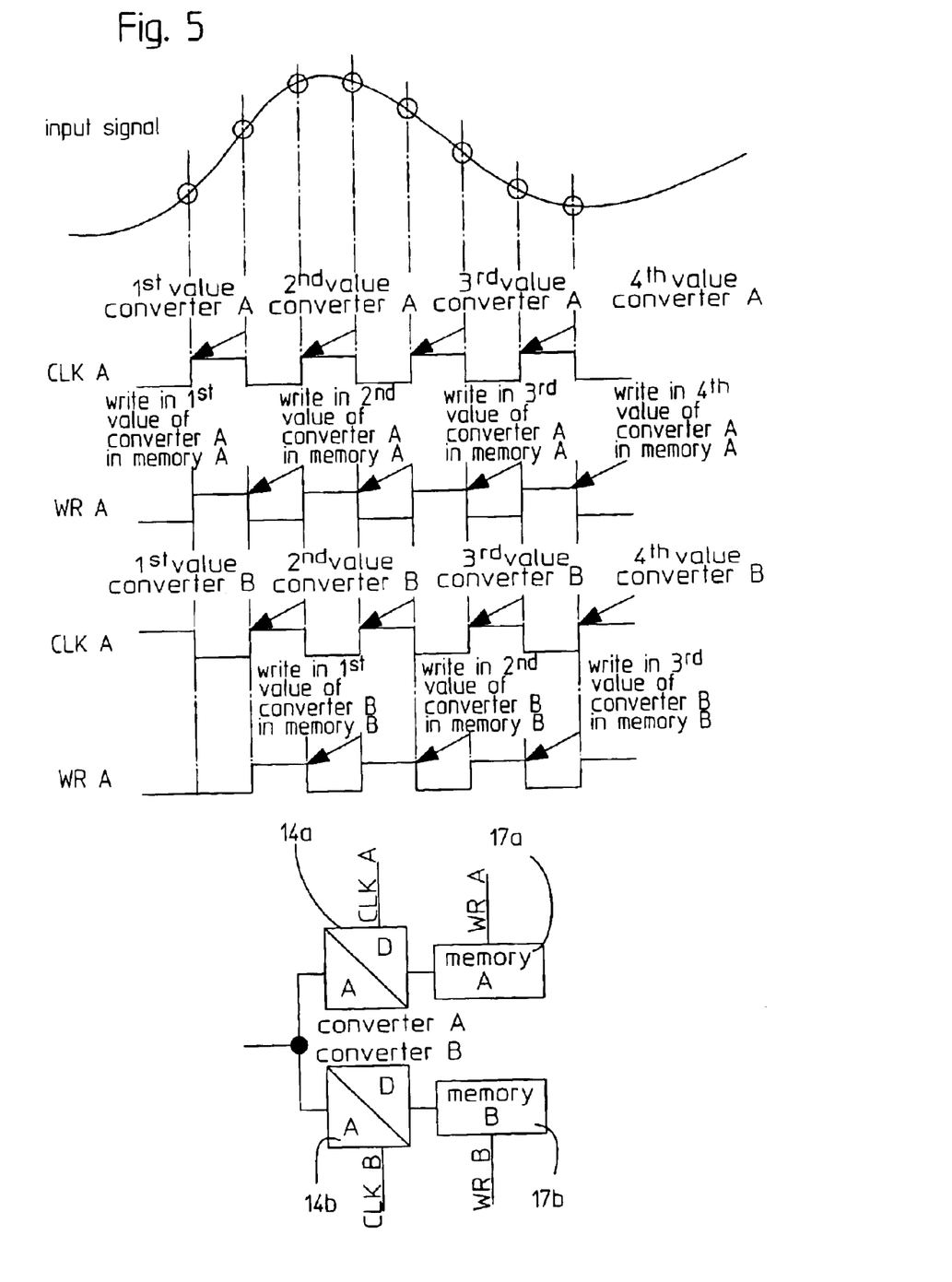
FIG. 5 shows details of the embodiment as per FIG. 4 and the associated sampling and storage scheme.

The two A/D converters 14a and 14b each are connected with a terminal memory unit 17a and 17b. The first value of the echo signal is acquired in the A/D converter 14, and is stored in the terminal memory unit 17a. The next value is converted by the A/D converter 14b and stored in the associated terminal memory unit 17b. The next value of the echo signal is then again converted by the first A/D converter. While the digitizing of a value ensues in an A/D converter 14a, 14b, the storage is performed in the other "branch", so that the A/D converter is again available for the next pulse.

Figure 10:
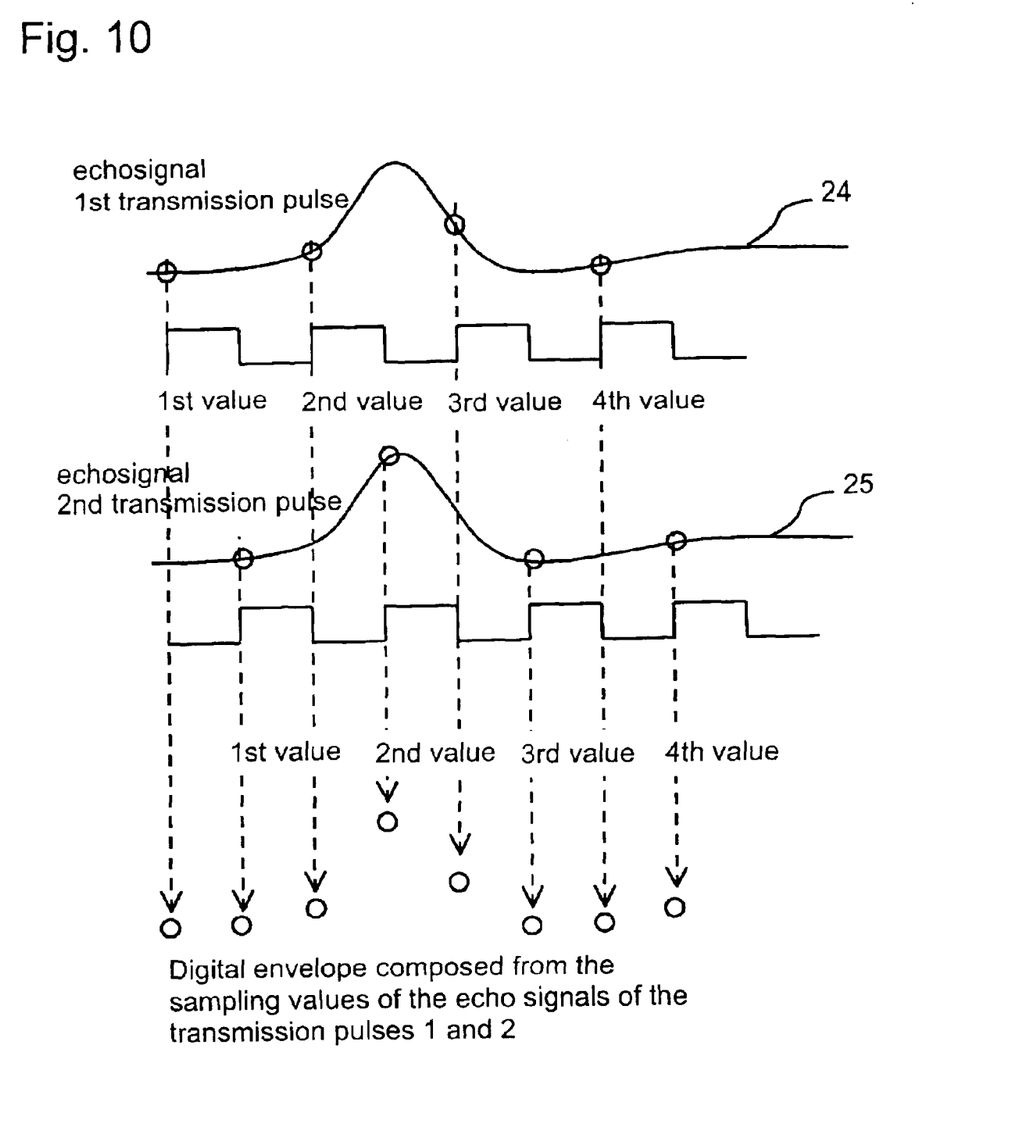
FIG. 10 shows a representation of a variant of a method according to the present invention for directly digitizing several envelopes for generating a digital envelope to which an evaluation means has access for determining the filling level height.

A further alternative exemplary embodiment of an inventive method is depicted in FIG. 10. Thus, a first envelope 24 is sampled by a single A/D converter with a predetermined sampling rate, i.e. the corresponding analog values are converted into digital values without temporal lengthening as otherwise usual in the prior art. These digital values are then directly stored, preferably without using an intermediate memory, in a terminal memory unit not shown here. The further envelope 25 generated from another reflected microwave signal, is sampled with the same sampling rate as the first envelope, the pulses during the sampling of the first envelope 24 and the second envelope 25, however, are mutually offset, in this case by half a sampling time. These directly digitized values of the second envelope, as well, are written into the terminal memory unit. Therewith, a sufficient number of digital values is now present in the terminal memory unit representing a common envelope by joining the two successively generated envelopes 24, 25, from which common envelope the filling level height will then be determined by the evaluation means. By sampling different envelopes several times, which is then stored in the digital form as a single envelope for the evaluation means, it is possible to perform a direct digitizing at a low frequency, allowing a storage directly in a terminal memory unit, to which the evaluation means may then access.

Figure 11:
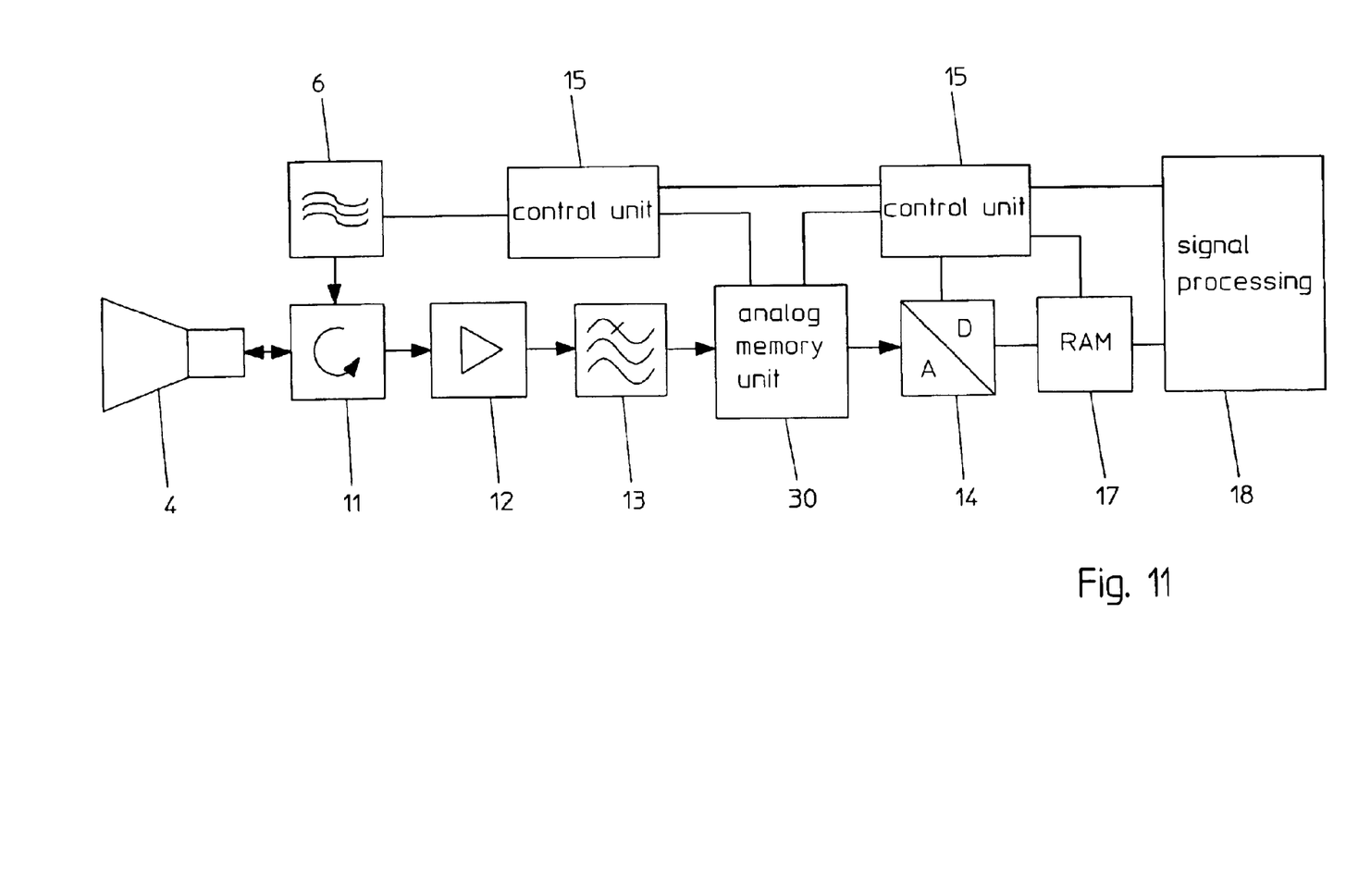
FIG. 11 shows a diagrammatic representation of electronic components of an apparatus according a further exemplary embodiment of the present invention comprising an analog memory unit.

A further exemplary embodiment of the present invention is schematically shown in FIG. 11. This apparatus differs from the exemplary embodiment of the present invention shown in FIG. 2 by an analog memory unit 30. The analog memory unit 30 is connected with a low pass filter 13, a A/D converter 14, and a control unit 15. The analog memory unit 30 works according to the FISO principle. An amplified microwave signal from the low pass filter 13 is stored in the analog memory unit 30 with a very high rate. As soon as the microwave signal is stored, the A/D converter 14 reads out the analog microwave signal stored in the memory unit with a rate less than the rate with which the signal was stored and converts the analog values in digital values. These digital values are then stored in an terminal memory unit 17 (RAM). The further proceeding is as mentioned above, for example, with reference to FIG. 1. An exemplary embodiment of an analog memory unit 30 useable for the invention is for example described in DE 30 13 256 A1, U.S. Pat. No. 5,200,983, and U.S. Pat. No. 5,144,525 or like the circuit "CompuScope 85G" mentioned above.

Of course, it is also possible to combine various features of the single described alternative exemplary embodiments of the present invention with each other. Furthermore, all exemplary embodiments of an apparatus according to the present invention may be integrated in a filling level measurement device working on the transit time principle and emitting microwave signals. Alternatively, an apparatus for directly digitizing microwave signals reflected from a filling product surface of a filling product present in a receptacle according to the present invention may be separated from such a filling level measurement device.

What is claimed is:

1. A method for directly digitizing microwave signals reflected from a filling product surface of a filling product present in a receptacle, the method comprising the steps of:
   sampling the microwave signals reflected from the filling product surface unmodified in their frequency;
   converting analog values resulting from the sampled microwave signals unmodified in their frequency into digital values;
   storing successive digital values of the convening step in intermediate memories, the intermediate memories being separate from an evaluation arrangement;
   reading out the intermediately stored digital values from the intermediate memories; and
   storing the read out digital values in a terminal memory unit to which the evaluation arrangement capable of determining the filling level has access.

2. The method of claim 1, wherein the convening step of the received microwave signals is performed by a single A/D converter, the digital values from the A/D converter being stored in the intermediate memories, and wherein the digital values stored in the intermediate memories are, at the same time, successively stored in the terminal memory unit so that the intermediate memories are again available for storing digital values from the A/D converter.

3. The method of claim 1, wherein the conversion of the received microwave signals is performed by a single A/D converter, the digital values from the A/D convener being stored in the intermediate memories, wherein the digital values of the intermediate memories are read out and stored in further intermediate memories, and wherein the digital values are read out from the further intermediate memories and stored in the terminal memory unit.

4. The method of claim 1, wherein the terminal memory unit includes a plurality of memory chips.

5. A method for directly digitizing microwave signals reflected from a filling product surface of a filling product present in a receptacle, the method comprising the steps of:
   sampling the microwave signals reflected from the filling product surface unmodified in their frequency;
   converting the resulting analog values into digital values using a plurality of A/D converters, with in each case successive analog values being converted into digital values by the plurality of A/D converters; and
   storing the digital values in a terminal memory unit to which an evaluation arrangement capable of determining the filling level has access.

6. The method of claim 5, wherein the digital values from each A/D converter are stored in an intermediate memory corresponding to the respective A/D converters, the digital values from each of the intermediate memories being read out and stored in the terminal memory unit.

7. The method of claim 6, wherein the digital values of the intermediate memories are read out and stored in further intermediate memories, the digital values being read out from the further intermediate memories and stored in the terminal memory unit.

8. An apparatus for directly digitizing microwave signals reflected from a filling product surface of a filling product present in a receptacle, comprising:

a reception circuit receiving and amplifying the reflected microwave signals without modifying a frequency of the reflected microwave signals;

an A/D converter connected to the reception circuit, the A/D converter being configured to sample the amplified microwave signal and convert the resulting analog values into digital values;

a plurality of intermediate memory arrangements, each of the intermediate memory arrangements being connected to the A/D converter;

a terminal memory unit connected to the intermediate memory arrangements; and a control arrangement storing successive digital values from the intermediate memory arrangement and restoring the digital values from the intermediate memory arrangements in the terminal memory unit, wherein the digital values stored in the terminal memory unit are available to an evaluation arrangement which determines the filling level.

9. The apparatus of claim 8, further comprising:

a further intermediate memory arrangement connected to the intermediate memory arrangement and the terminal memory unit.

10. The apparatus of claim 8, wherein the terminal memory unit includes a plurality of memory chips.

11. The apparatus of claim 8, wherein the A/D converter is in operation for a space of time of between 1 ns and 0.5 ms.

12. The apparatus of claim 8, wherein the A/D converter is in operation for a space of time of between 10 ns and 0.3 ms.

13. A filling level measurement device working on a transit time principle and emitting microwave signals, comprising:

a reception circuit receiving and amplifying reflected microwave signals without modifying a frequency of the reflected microwave signals;

an A/D converter connected to the reception circuit, the A/D converter sampling the amplified microwave signal and converting resulting analog values into digital values;

a plurality of intermediate memory arrangements, each of the intermediate memory arrangements being connected to the A/D converter;

a terminal memory unit connected to the intermediate memory arrangements; and a control arrangement storing successive digital values from the intermediate memory arrangements and restoring the digital values stored in the intermediate memory arrangements in the terminal memory unit, the digital values stored in the terminal memory unit being available to an evaluation arrangement which determines the filling level.

14. The filling level measurement device according to claim 13, wherein the device is connected to a two-wire loop which provides energy and communication to the device.

15. The filling level measurement device according to claim 14, wherein the two-wire loop is a 4–20 mA two-wire loop.

16. An apparatus for directly digitizing microwave signals reflected from a filling product surface of a filling product present in a receptacle, comprising:

a reception circuit receiving and amplifying the reflected microwave signals without modifying a frequency of the reflected microwave signals;

a plurality of A/D converters, each A/D converter being connected to the reception circuit for sampling the amplified microwave signal and converting resulting analog values into digital values;

a terminal memory unit connected to the A/D converters for storing individual digital values received therefrom; and a control arrangement storing successive digital values in the intermediate memory arrangements and restoring the digital values stored in the intermediately memory arrangements in the terminal memory unit, the digital values stored in the terminal memory unit being available to an evaluation arrangement which determines the filling level.

17. The apparatus of claim 16, wherein each intermediate memory arrangement is connected between each of the A/D converters and the terminal memory unit.

18. The apparatus of claim 16, wherein at least one of the A/D converters is in operation for a space of time of between 1 ns and 0.5 ms.

19. The apparatus of claim 18, wherein at least one of the A/D converter is in operation for a space of time of between 10 ns and 0.3 ms.

20. A filling level measurement device working on a transit time principle and emitting microwave signals, comprising:

a reception circuit receiving and amplifying reflected microwave signals without modifying a frequency of the reflected microwave signals;

a plurality of A/D converters, each A/D converter being connected to the reception circuit for sampling the amplified microwave signal and converting resulting analog values into digital values;

a terminal memory unit connected to the A/D converters for storing individual digital values received therefrom; and a control arrangement storing successive digital values in the intermediate memory arrangement and restoring the digital values stored in the intermediate memory arrangements in the terminal memory unit, the digital values stored in the terminal memory unit being available to an evaluation arrangement which determines the filling level.

21. The filling level measurement device according to claim 20, wherein the device is connected to a two-wire loop which provides energy and communication to the device.

22. The filling level measurement device according to claim 21, wherein the two-wire loop is a 4–20 mA two-wire loop.

23. A method for directly digitizing microwave signals reflected from a filling product surface of a filling product present in a receptacle, the method comprising the steps of:

sampling microwave signals reflected from the filling product surface, wherein the sampled signals have an unmodified frequency in a first sampling step;

converting analog values resulting from the first sampling step into digital values using an A/D converter in a first converting step;

storing digital values resulting from the first converting step in a terminal memory unit in a first storing step;

sampling at least one further microwave signal reflected from the filling product surface after the microwave signal sampled in the first sampling step, wherein the further microwave signal has an unmodified frequency and is offset from the microwave signal sampled in the first sampling step;

converting analog values resulting from the second sampling step into digital values using the A/D converter in a second converting step; and storing digital values from the second converting step in the terminal memory unit, wherein the stored digital values from the first and second converting steps represent an envelope and are available to an evaluation arrangement which determines the filling level.

24. An apparatus for directly digitizing microwave signals reflected from a filling product surface of a filling product present in a receptacle, comprising:

a reception circuit receiving and amplifying reflected microwave signals without modifying a frequency of the reflected microwave signals;

an A/D converter connected to the reception circuit, the A/D converter sampling first and second amplified microwave signals and converting resulting analog values which are unmodified in their frequency into digital values, the second signal being later in time in an offset manner from the first signal;

a terminal memory unit connected to the A/D converter for storing individual digital values received therefrom; and a control arrangement storing digital values in the terminal memory unit, the digital values stored in the terminal memory unit being available to an evaluation arrangement which determines the filling level.

25. A method for directly digitizing microwave signals reflected from a filling product surface of a filling product present in a receptacle, the method comprising the steps of:

sampling at a first rate microwave signals reflected from the filling product surface without modifying a frequency thereof;

storing analog values resulting from the sampling step in an analog memory unit;

reading out the stored analog values at a second rate, the second rate being less than the first rate;

converting the read out analog values into digital values using an A/D converter;

storing digital values from the A/D converter in a terminal memory unit; and providing the stored digital values representing an envelope curve to an evaluation arrangement which determines the filling level.

26. An apparatus for directly digitizing microwave signals reflected from a filling product surface of a filling product present in a receptacle, comprising:

a reception circuit receiving and amplifying reflected microwave signals without modifying a frequency thereof;

an analog memory unit connected to the reception circuit and storing amplified analog values from the reception circuit;

an A/D converter connected to the analog memory unit, the A/D converter reading out the analog values stored therein and sampling and converting the analog values into digital values;

a terminal memory unit connected to the A/D converter and storing individual digital values therefrom; and a control arrangement, wherein the amplified reflected signal is stored in the analog memory unit at a first rate, wherein the amplified reflected signal stored in the analog memory unit is read out at a second rate and converted into digital values using the A/D converter, the second rate being less than the first rate, and wherein the digital values are stored in the terminal memory unit and are available to an evaluation arrangement which determines the filling level.

* * * * *